United States Patent
Stone et al.

(10) Patent No.: US 7,187,820 B1
(45) Date of Patent: Mar. 6, 2007

(54) OPTICAL TIME DELAY SYSTEM

(75) Inventors: Thomas W. Stone, Hellertown, PA (US); Thomas A. Mitchell, Nazareth, PA (US)

(73) Assignee: Wavefront Research, Inc., Bethlehem, PA (US)

( * ) Notice: Subject to any disclaimer, the term of this patent is extended or adjusted under 35 U.S.C. 154(b) by 3 days.

(21) Appl. No.: 10/987,272

(22) Filed: Nov. 12, 2004

Related U.S. Application Data

(60) Provisional application No. 60/519,738, filed on Nov. 12, 2003.

(51) Int. Cl.
*G02B 6/35* (2006.01)
*G02B 5/32* (2006.01)

(52) U.S. Cl. .............................. 385/18; 385/37; 359/15; 359/569

(58) Field of Classification Search .................... None
See application file for complete search history.

(56) References Cited

U.S. PATENT DOCUMENTS

| | | | |
|---|---|---|---|
| 5,692,077 A | 11/1997 | Stone et al. | 385/16 |
| 5,771,320 A | 6/1998 | Stone | 385/16 |
| 6,072,923 A | 6/2000 | Stone | 385/16 |
| 6,266,176 B1 * | 7/2001 | Anderson et al. | 359/245 |
| 6,388,815 B1 | 5/2002 | Collins, Jr. et al. | 359/633 |
| 6,525,889 B1 | 2/2003 | Collins, Jr. et al. | 359/836 |
| 2005/0088339 A1 * | 4/2005 | Yap | 342/375 |

OTHER PUBLICATIONS

U.S. Appl. No. 60/519,738, filed Nov. 12, 2003 for Thomas W. Stone, entitled: "[Improved] Optical Time Delay System."

* cited by examiner

*Primary Examiner*—Michelle Connelly-Cushwa
*Assistant Examiner*—Jerry T. Rahll
(74) *Attorney, Agent, or Firm*—Burns & Levinson, LLP; Jacob N. Erlich

(57) ABSTRACT

Optical systems utilizing pixellated switchable elements to provide interaction between at least two White Cells.

13 Claims, 4 Drawing Sheets optical power is distributed among optional lenses and plane/curved mirrors optical power is distributed among optional lenses and plane/curved mirrors optical power is distributed among optional lenses and plane/curved mirrors

OPTICAL TIME DELAY SYSTEM

CROSS REFERENCE TO RELATED APPLICATIONS

This application claims priority of U.S. Provisional Application 60/519,738 filed on Nov. 12, 2003, which is incorporated by reference herein.

BACKGROUND OF THE INVENTION

This invention relates to an improved optical time delay system based on switchable diffraction gratings and a White Cell geometry. The use of the switchable diffraction gratings in the form of switchable transmission gratings and switchable volume holographic mirrors adds a reliable electro-optic switch technology with low insertion loss, low crosstalk, and high reliability to relatively compact White Cell based time delay systems.

White Cell geometries have been previously used for time delay systems. In the original White cell, light bounces back and forth repeatedly between three spherical mirrors, all identical, and is focused to a new spot on every bounce. A number of proposed systems use a White Cell multi-pass approach in conjunction with spatial light modulators, deformable mirrors, and MEMS-type spatial light modulators. However, existing art is limited in application to phased array beamforming due to lifetime issues. For example, a phased array antenna that steers a beam at a kilohertz rate requires more than 31.5 billion time delay reconfigurations per year. For systems utilizing MEMS devices, pointing stability of the mechanically deflected mirrors is an issue. Also for systems using moving parts (such as MEMS) reliability and repeatability are concerns.

Therefore, there is a need for an electro-optic White Cell based optical time delay system that has no moving parts.

Further more, there is a need for a time delay system that exhibits improved long-term stability.

SUMMARY OF THE INVENTION

Optical systems utilizing pixellated switchable elements to provide interaction between at least two White Cells are disclosed.

In one embodiment of the present invention two or more White Cells are used to each multiply image across the face of one of a pair of symmetric pixellated switchable elements, pixellated switchable gratings in one embodiment—one pixellated switchable grating in each White Cell. In one embodiment the pixellated switchable gratings comprise switchable volume transmission holographic gratings in a polymer dispersed liquid crystal material. In another embodiment the pixellated switchable gratings comprise switchable volume reflection holographic gratings (mirrors) in a polymer dispersed liquid crystal material.

For a better understanding of the present invention, together with other and further objects thereof, reference is made to the accompanying drawings and detailed description and its scope will be pointed out in the appended claims.

DETAILED DESCRIPTION OF THE PREFERRED EMBODIMENTS

Optical systems utilizing pixellated switchable elements to provide interaction between at least two White Cells are disclosed hereinbelow.

Figure 1:
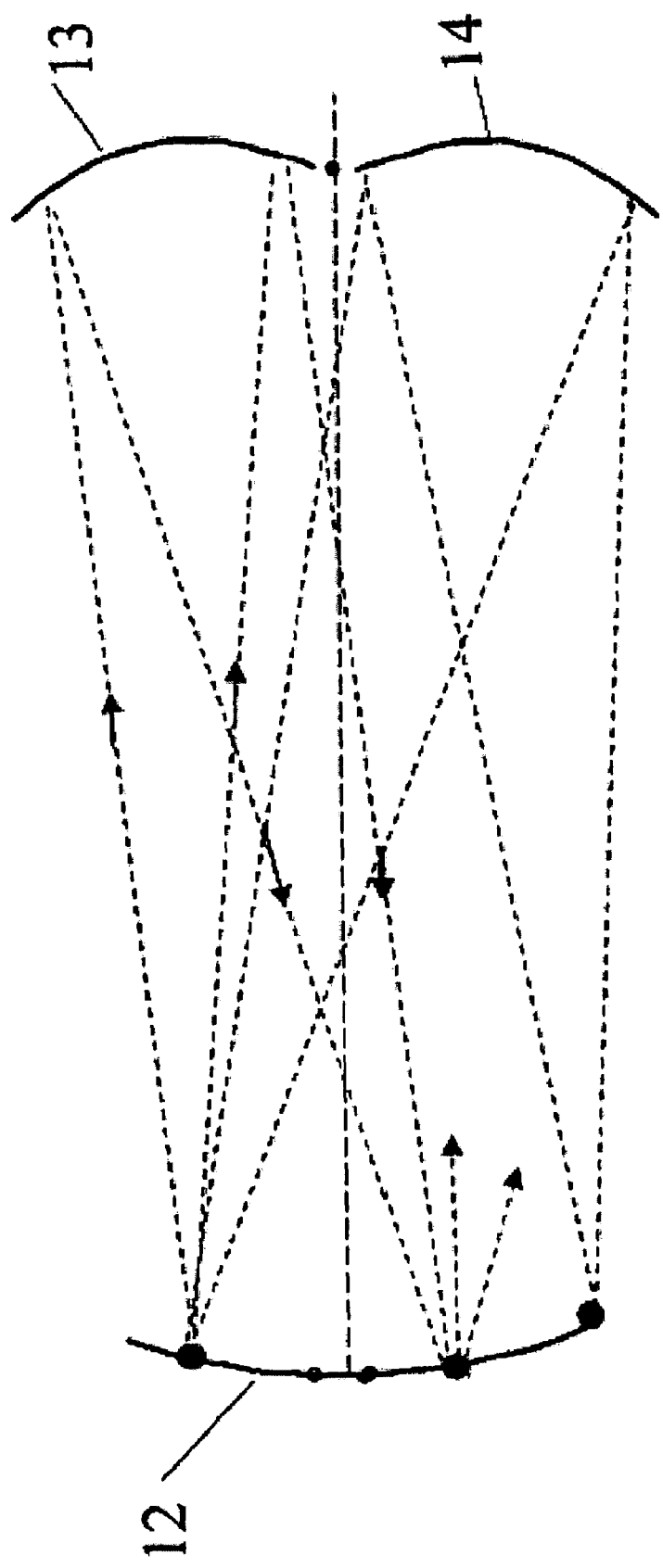
FIG. 1 is a schematic graphical description of a conventional White Cell.

The present invention is based on the conventional White cell, shown in FIG. 1. A diagram of the path of a light beam passing through a conventional White cell is also shown in FIG. 1. The cell comprises three identical spherical mirrors 12, 13, 14, all of the same radius of curvature. Electromagnetic radiation (hereinafter also referred to as light) from the second mirror is imaged onto the third mirror, and vice versa. The beam may traverse the cell a predetermined number of times, depending on the locations of the centers of curvature of the second and third mirrors.

Figure 2:
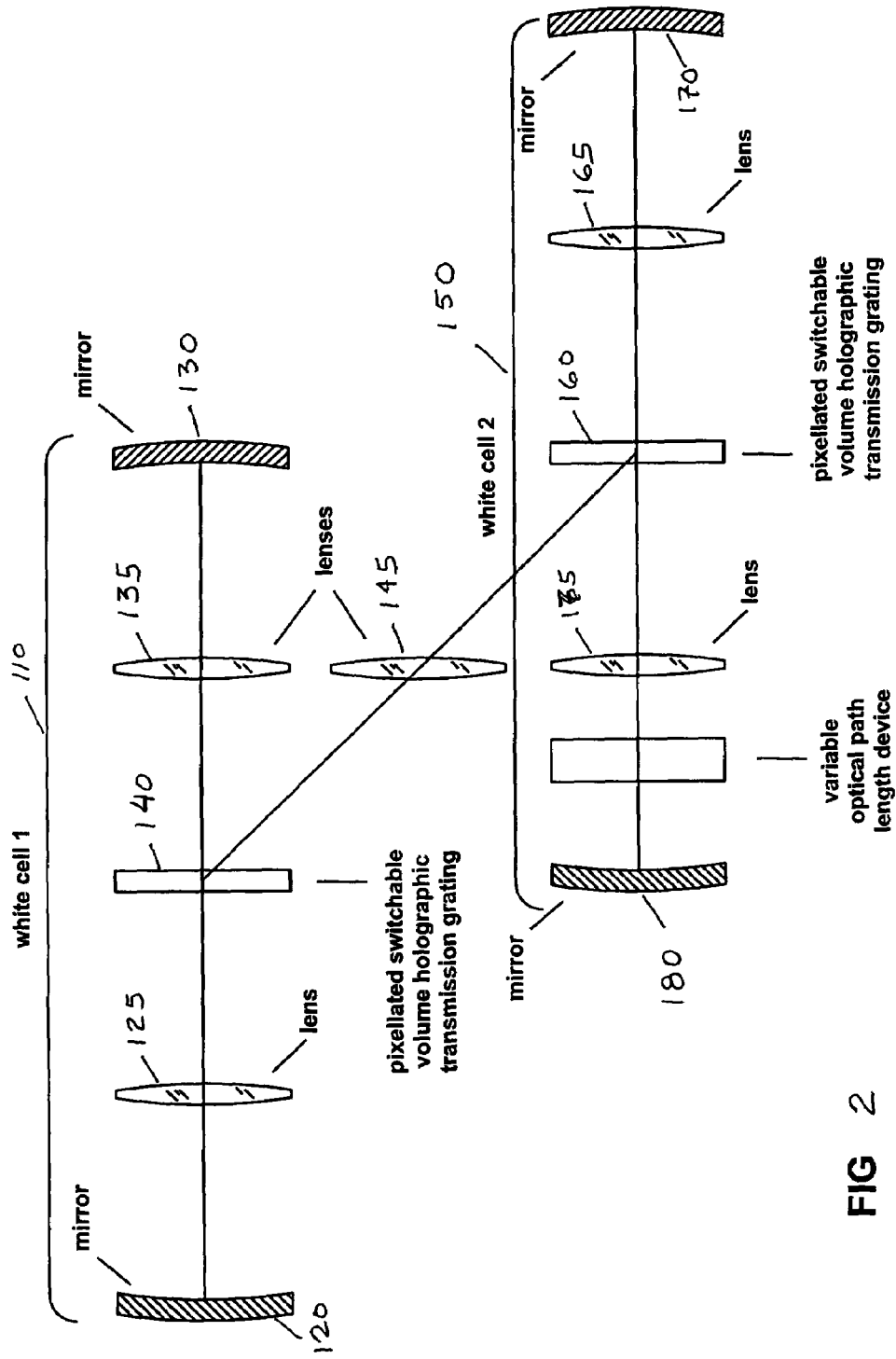
FIG. 2 is a switchable holographic transmission grating based time delay system of the present invention.
Figure 3:
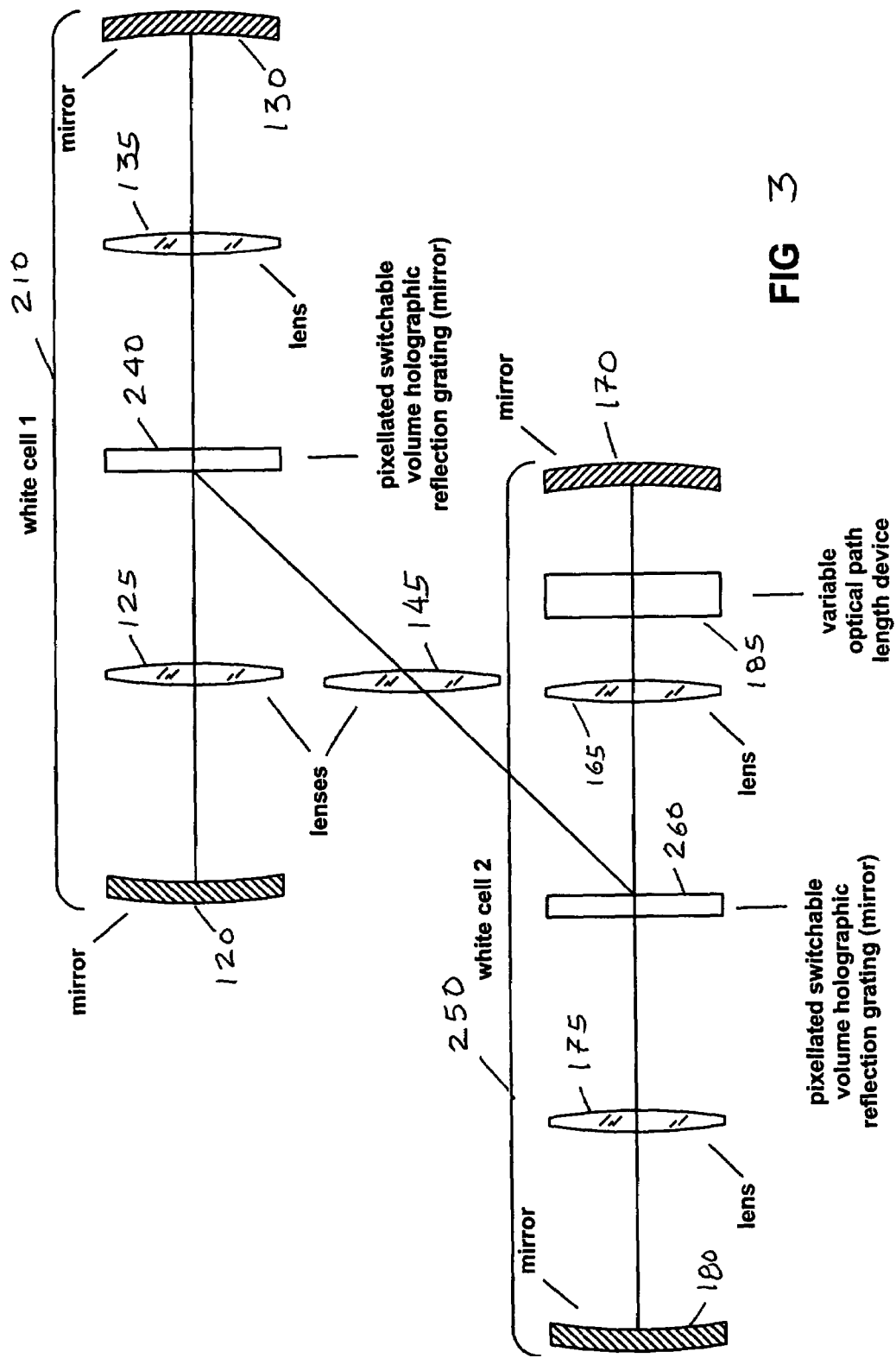
FIG. 3 is a switchable holographic reflection grating (volume holographic mirror) based time delay system of the present invention.

In one embodiment of the present invention, shown in FIGS. 2 and 3, two White Cells are used to each multiply image across the face of one of a pair of symmetric pixellated switchable elements—symmetric pixellated switchable gratings in one embodiment, one pixellated switchable grating in each White Cell. FIG. 2 illustrates a system of the present invention with a pair of pixellated switchable gratings comprising switchable volume transmission holographic gratings. FIG. 3 illustrates a system of the present invention with pixellated switchable gratings comprising switchable volume reflection holographic gratings (mirrors).

In one embodiment, shown in FIG. 2, the pixellated switchable gratings comprise switchable volume transmission holographic gratings in a polymer dispersed liquid crystal material (140, 160, FIG. 2). In another embodiment, shown in FIG. 3, the pixellated switchable gratings comprise switchable volume reflection holographic gratings (mirrors) in a polymer dispersed liquid crystal material (240, 260, FIG. 3). Embodiments of switchable pixellated gratings are described in detail in U.S. Pat. Nos. 5,771,320, 6,072,923, and 5,692,077, all of which are incorporated by reference herein. Each of the pixels in these pixellated switchable gratings can be set to "off" states in which the pixels are transparent, or to "on" states where the pixels are diffracting (either deflecting the incident beam in transmission or reflection). Signals focused onto individual switchable grating or mirror pixels can be either transmitted or deflected into, out of, or between the multi-pass White Cells.

Referring to FIGS. 2 and 3, the switchable pixellated gratings (140, 160, FIG. 2; 240, 260, FIG. 3) are configured to couple the light incident on a given "on" pixel to the corresponding pixel of the paired switchable pixellated gratings. Similarly, if a given pixel is set to "off", light incident on that pixel is left to continue propagating in the White Cell (110, 150, FIG. 1; 210, 250, FIG. 3) where it is currently located. In this fashion, light is multiply imaged (also referred to as imaged in a number of propagation paths) in a given White Cell (110, 150, FIG. 1; 210, 250, FIG. 3), and corresponding switched grating pixels on the two switchable pixellated gratings (140, 160, FIG. 2; 240, 260, FIG. 3) are switched on in pairs in order to exchange the beam on those "on" pixels from one White Cell (110, 150, FIG. 1; 210, 250, FIG. 3) to the other White Cell (110, 150, FIG. 1; 210, 250, FIG. 3).

Variable optical path length elements (185, FIGS. 2, 3) can be introduced into the paths of at least one of the White Cells (110, 150, FIG. 1; 210, 250, FIG. 3) in order to provide switchable increments of time delay with each of the multiply imaged cycles in the White Cells (110, 150, FIG. 1; 210, 250, FIG. 3). For example, in one embodiment, if light is left to multiply bounce in one White Cell (110, 150, FIG. 1; 210, 250, FIG. 3) the whole time, it picks up a base optical time delay. However, if on any of the multiple bounces in the one White Cell (110, 150, FIG. 1; 210, 250, FIG. 3) the beam is directed onto the other White Cell (110, 150, FIG. 1; 210, 250, FIG. 3), that beam will pick up additional increments in time delay for each bounce in the other White Cell (110, 150, FIG. 1; 210, 250, FIG. 3) before returning to the one White Cell (110, 150, FIG. 1; 210, 250, FIG. 3). In such a manner the beam is switched in to the other White Cell (110, 150, FIG. 1; 210, 250, FIG. 3) for picking up selectable incremental time delays.

Lenses or imaging elements, (125, 135, 145, 165, 175, FIGS. 2, 3) can be utilized to allow the use of different mirror configurations (planar/curved) and to more effectively image onto the pixellated switchable elements.

If the selectable incremental time delays are arranged in powers of two, a binary tree of optical time delays may be established where with N cycles through the time delay system, 2**N possible time delays may be impressed onto the input beam.

Figure 4:
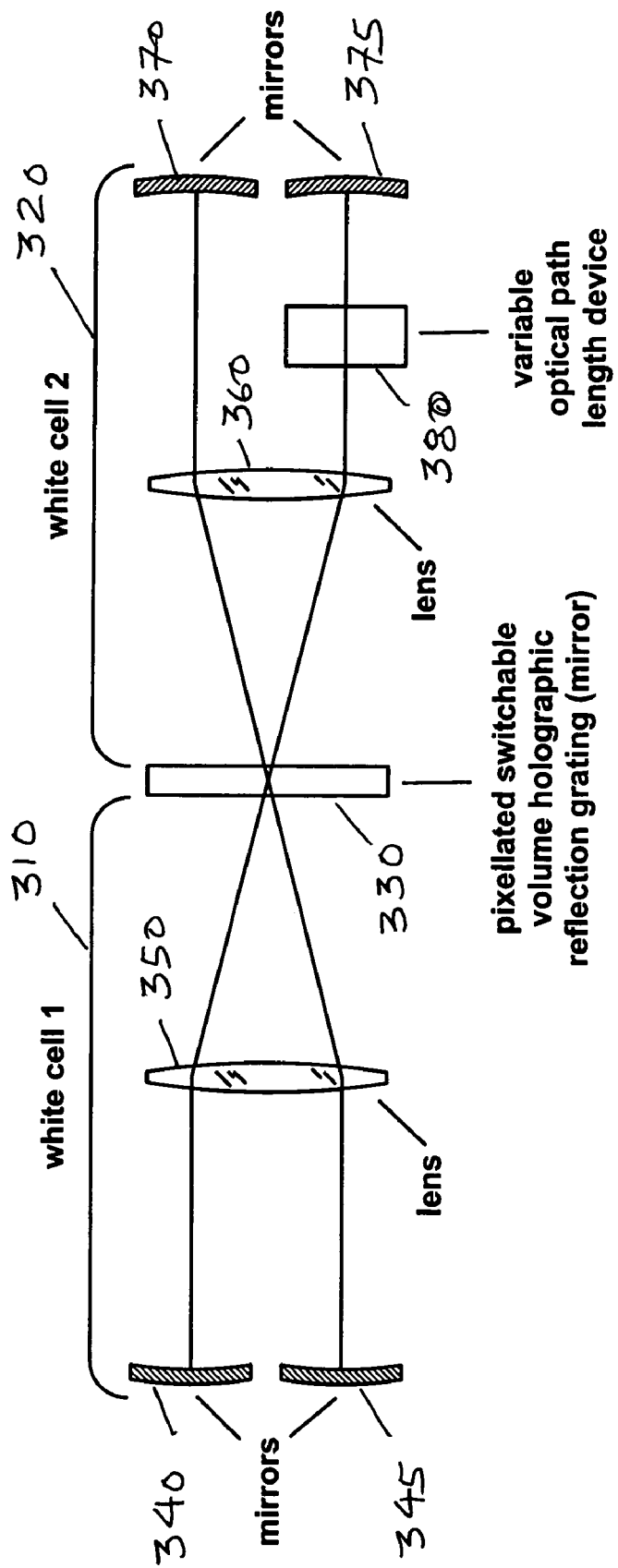
FIG. 4 is a switchable holographic reflection grating (volume holographic mirror) based time delay system of the present invention where the two pixellated mirrors are replaced by a single mirror.

Similarly, a third or further White Cells may be added in series or parallel, each coupled as are the two White Cells shown in FIGS. 2–4, using imaged pixellated switchable holographic gratings or mirrors.

For the case of switchable pixellated volume gratings comprising switchable volume reflection holographic gratings (mirrors), the pair of symmetric pixellated switchable gratings can be combined into a single pixellated switchable grating (330, FIG. 4), as shown in FIG. 4. For each of the pixels in a reflective state, light is reflected in the same White Cell (310, 320, FIG. 4) in which it was incident. The White Cells (310, 320) include two or more mirrors or reflecting optical components (340, 345 for White Cell 310; 370, 375 for White Cell 320), a lens (350 for White Cell 310; 360 for White Cell 320), and the pixellated switchable reflective grating 330, when in a reflective state. For the pixels in a transmissive state (off), light is transmitted to the opposite White Cell 310, 320.

A variable optical path length element 380 can be introduced into the paths of at least one of the White Cells 310, 320. By changing the optical path lengths in sequential paths of one White Cell 310, 320 compared to the other, incremental delays may be selected by switching the sequentially imaged pixels on or off. If the variations in path lengths progress as powers of two, a binary tree delay line is formed and N bounces allows for up to 2**N variable delays.

It should be noted that although single mirrors are shown in each of the White Cells of FIGS. 2 and 3, multiple mirrors are possible in White Cells (see, for example, FIG. 1) and such embodiments are within the scope of this invention. Also, it should be noted that although FIGS. 2, 3, and 4 depict only one variable optical path length element, embodiments with a number of variable optical path length elements are also within the scope of this invention. Similarly, it should be noted that optical power may be shared or distributed among the mirrors (flat for no optical power and curved for power) and lenses or imaging elements described in the systems of this invention. Since the multiple imaging required of the imaging system is demanding when small spots or many passes are required, these lenses or imaging elements may contain multiple elements as required to eliminate and/or balance imaging aberrations.

Although the invention has been described with respect to various embodiments, it should be realized this invention is also capable of a wide variety of further and other embodiments within the spirit and scope of the appended claims.

What is claimed is:

1. An optical system comprising:
   a first subsystem comprising:
      a first reflecting optical component;
      at least one other reflecting optical component optically disposed to provide, for an input beam of electromagnetic radiation, a plurality of propagation paths between said first reflecting optical component and said at least one other reflecting optical component;
      a first pixellated volume holographic switchable element optically disposed between said first reflecting optical component and said at least one other reflecting optical component; and
   a second subsystem comprising:
      a second reflecting optical component;
      at least one other second reflecting optical component optically disposed to provide, for an incoming beam of electromagnetic radiation, a plurality of propagation paths between said second reflecting optical component and said at least one other reflecting optical component;
      a second pixellated volume holographic switchable element optically disposed between said second reflecting optical component and said at least one other second reflecting optical component;
   said first pixellated volume holographic switchable element being capable of directing electromagnetic radiation, from said first sub-system, to said second pixellated switchable element;
   said second pixellated volume holographic switchable element being capable of directing received electromagnetic radiation to said second reflecting optical component or said at least one other reflecting optical component of the second subsystem.

2. The optical system of claim 1 further comprising:
   an imaging optical element optically disposed between said first reflecting optical component and said first pixellated volume holographic switchable element.

3. The optical system of claim 1 further comprising:
   an imaging optical element optically disposed between said at least one other reflecting optical component and said first pixellated volume holographic switchable element.

4. The optical system of claim 1 further comprising:
   an imaging optical element optically disposed between said second reflecting optical component and said second pixellated volume holographic switchable element.

5. The optical system of claim 1 further comprising:
   an imaging optical element optically disposed between said at least one other reflecting optical component of the second subsystem and said second pixellated volume holographic switchable element.

6. The optical system of claim 1 further comprising:
   an imaging optical element optically disposed between said first said first pixellated volume holographic switchable element and said second pixellated volume holographic switchable element.

7. The optical system of claim 1 further comprising:
a variable optical path length element optically disposed to intersect at least some of the plurality of propagation paths in said first subsystem.

8. The optical system of claim 1 further comprising:
a variable optical path length element optically disposed to intersect at least some of the plurality of propagation paths in said second subsystem.

9. The optical system of claim 1 wherein said first pixellated switchable element comprises a first pixellated volume holographic switchable volume holographic transmission grating, and said second pixellated volume holographic switchable element comprises a second pixellated switchable volume holographic transmission grating.

10. The optical system of claim 1 wherein said first pixellated volume holographic switchable element comprises a first pixellated switchable volume holographic reflection grating, and said second pixellated volume holographic switchable element comprises a second pixellated switchable volume holographic reflection grating.

11. An optical system comprising:
a first plurality of reflecting optical components;
a second plurality of reflecting optical components;
a pixellated switchable volume reflecting element optically disposed between said first plurality of reflecting optical components and said second pluralities of reflecting optical components;
a first imaging optical element optically disposed between said first plurality of reflecting optical components and said pixellated switchable volume reflecting element; and
a second imaging optical element optically disposed between said second plurality of reflecting optical elements and said pixellated switchable volume reflecting element;
said first plurality of reflecting optical components being optically disposed to provide, for an input beam of electromagnetic radiation, a plurality of propagation paths between said first plurality of reflecting optical components and said pixellated switchable volume reflecting element;
said first plurality of reflecting optical components, said first imaging optical element and said pixellated switchable volume reflecting element comprising a first sub-system;
said second plurality of reflecting optical components being optically disposed to provide, for another input beam of electromagnetic radiation, a plurality of propagation paths between said second plurality of reflecting optical components and said pixellated switchable volume reflecting element;
said second plurality of reflecting optical components, said second imaging optical element and said pixellated switchable volume reflecting element comprising a second sub-system;
said pixellated switchable volume reflecting element being capable of transmitting electromagnetic radiation from said first sub-system to said second sub-system and being also capable of transmitting electromagnetic radiation from said second sub-system to said first sub-system, when said pixellated switchable volume reflecting element is a transmissive state.

12. The optical system of claim 11 further comprising:
a variable optical path length element optically disposed to intersect at least some of the plurality of propagation paths in said first subsystem.

13. The optical system of claim 11 further comprising:
a variable optical path length element optically disposed to intersect at least some of the plurality of propagation paths in said second subsystem.

* * * * *